US007881955B2

(12) United States Patent
Ewart et al.

(10) Patent No.: US 7,881,955 B2
(45) Date of Patent: Feb. 1, 2011

(54) METHOD AND SYSTEM FOR RESERVATION AND MANAGEMENT OF RECREATIONAL ACTIVITIES

(75) Inventors: Craig Ewart, Mont Tremblant (CA); John Robert Christopher Winlo, Lac Supérieur (CA)

(73) Assignee: Rezact Inc., Montreal (CA)

( * ) Notice: Subject to any disclaimer, the term of this patent is extended or adjusted under 35 U.S.C. 154(b) by 1014 days.

(21) Appl. No.: 11/061,515

(22) Filed: Feb. 22, 2005

(65) Prior Publication Data
US 2006/0190309 A1 Aug. 24, 2006

(51) Int. Cl.
*G06F 9/44* (2006.01)
(52) U.S. Cl. .................. 705/7; 705/5; 705/6; 705/22
(58) Field of Classification Search .............. 705/1, 705/5, 6, 8
See application file for complete search history.

(56) References Cited

U.S. PATENT DOCUMENTS

| | | | | |
|---|---|---|---|---|
| 5,237,499 | A * | 8/1993 | Garback | 705/5 |
| 5,648,900 | A * | 7/1997 | Bowen et al. | 705/5 |
| 5,953,705 | A * | 9/1999 | Oneda | 705/5 |
| 6,134,534 | A * | 10/2000 | Walker et al. | 705/26 |
| 6,363,351 | B1 * | 3/2002 | Moro | 705/5 |
| 6,658,418 | B2 | 12/2003 | Burns | |
| 6,711,548 | B1 | 3/2004 | Rosenblatt | |
| 6,738,750 | B2 | 5/2004 | Stone et al. | |
| 6,760,306 | B1 | 7/2004 | Pan et al. | |
| 6,813,608 | B1 * | 11/2004 | Baranowski | 705/6 |
| 6,865,539 | B1 * | 3/2005 | Pugliese, III | 705/5 |
| 7,225,442 | B2 * | 5/2007 | Dutta et al. | 718/100 |
| 7,328,166 | B1 * | 2/2008 | Geoghegan et al. | 705/5 |
| 7,363,241 | B1 * | 4/2008 | Dong | 705/5 |
| 2001/0034623 | A1 * | 10/2001 | Chung | 705/5 |
| 2002/0032784 | A1 * | 3/2002 | Darago et al. | 709/229 |

(Continued)

FOREIGN PATENT DOCUMENTS

JP    2001-357110    12/2001

OTHER PUBLICATIONS

Yao-Jen Chang "An Investigation into Considerations for the Design of IS to Improve the Utility of the Use of the Co-alignment Model: An Integration of Strategy and IT as A Coordination Strategy Framework—A Case Study of Virginia Beach" PhD thesis Virginia Polytechnic Institute and State University (2004).*

(Continued)

*Primary Examiner*—Romain Jeanty
*Assistant Examiner*—Gurkanwaljit Singh
(74) *Attorney, Agent, or Firm*—Ogilvy Renault LLP

(57) ABSTRACT

A reservation and management system for recreational activities offered by a plurality of activity operators, comprises a database for storing information regarding a plurality of recreational activities, including inventory information and a financial record containing financial information, for reservation transactions carried out for said activity and profile information for a plurality of subscribers, including activity operators and resellers. The system includes a reservation information compiler for providing information for an activity, a transaction module for updating inventory information and financial record following a reservation transaction request. A plurality of purchase modules are also provided, allowing clients and resellers to access information and make reservation for activities. An operator inventory management module allows to receive and update activity information.

11 Claims, 4 Drawing Sheets

U.S. PATENT DOCUMENTS

| | | | |
|---|---|---|---|
| 2002/0047861 A1* | 4/2002 | LaBrie et al. | 345/733 |
| 2002/0055865 A1* | 5/2002 | Hammann | 705/7 |
| 2002/0055872 A1* | 5/2002 | LaBrie et al. | 705/14 |
| 2002/0063723 A1 | 5/2002 | Hirono | |
| 2002/0069093 A1* | 6/2002 | Stanfield | 705/5 |
| 2002/0091535 A1 | 7/2002 | Kendall et al. | |
| 2002/0095312 A1* | 7/2002 | Wheat | 705/1 |
| 2002/0099842 A1* | 7/2002 | Jennings et al. | 709/231 |
| 2003/0004760 A1* | 1/2003 | Schiff et al. | 705/5 |
| 2003/0004772 A1* | 1/2003 | Dutta et al. | 705/8 |
| 2003/0040946 A1* | 2/2003 | Sprenger et al. | 705/6 |
| 2003/0050818 A1* | 3/2003 | Maie et al. | 705/8 |
| 2003/0160694 A1 | 8/2003 | DeMatteo | |
| 2004/0122854 A1* | 6/2004 | McKenna et al. | 707/103 R |
| 2004/0138906 A1 | 7/2004 | Fagan | |
| 2004/0254842 A1* | 12/2004 | Kirkegaard | 705/22 |
| 2004/0267567 A1* | 12/2004 | Barrera et al. | 705/2 |
| 2005/0193011 A1* | 9/2005 | Peebles et al. | 707/104.1 |
| 2006/0015375 A1* | 1/2006 | Lee et al. | 705/5 |
| 2006/0020481 A1* | 1/2006 | Lee et al. | 705/1 |
| 2006/0020515 A1* | 1/2006 | Lee et al. | 705/22 |

OTHER PUBLICATIONS

"Automating Your Reservation" Park & Recreation (Jun. 1992) p. 44.*

Anil K. Gupta et al., "Converting global presence into global competitive advantage" the Academy of Management Executive (May 2001).*

Craig M Ross; Daniel R Sharpless "Innovative Information Technology and Its Impact on Recreation and Sport Programming" Journal of Physical Education, recreation & Dance (Nov./Dec. 1999).*

Breffni n. Noone et al., "Integrating customer relationship management and revenue management: A Hotel Prespective" Journal of Revenue and Pricing Management (Apr. 2003).*

* cited by examiner

METHOD AND SYSTEM FOR RESERVATION AND MANAGEMENT OF RECREATIONAL ACTIVITIES

FIELD OF THE INVENTION

The invention relates to methods and systems allowing for planning and reserving activities over a network and providing a centralized management of the activities.

BACKGROUND OF THE INVENTION

Currently, the Internet is a great tool for vacation planning by providing access to a variety of information, as well as reservation systems. Users who travel to certain destinations or within a given geographical area oftentimes like to use the Internet in advance to gather more information regarding their destination and to purchase tickets for activities, events, etc. for the duration of their trip. Prior art systems provide such information and reservation capabilities for lodging and transportation service providers, by retrieving availability information from the service providers' own inventory management systems and providing it to the end users.

Unfortunately, such systems do not provide information regarding recreational activities provided by small activity operators. Activity operators at resorts, such as ski school operators, dogsled operators, horseback riding operators, snowmobile operators, ice climbing operators, plane tours operators, tubing operators, etc., oftentimes do not have the resources to acquire and implement adequate inventory management/account software that would permit them to interface with the prior art web reservation systems described above.

Furthermore, the prohibitive costs related to interactive web systems setup and maintenance prevent such activity operators to use electronic channels for advertising and selling their services to clients. Users at a destination could benefit from accessing terminals allowing them to search through recreational activities offered by local activity operators and make reservations depending on activity availabilities.

There exists therefore a need for a system providing reservation and inventory management functions for recreational activities offered by a plurality of activity operators within a geographical area.

SUMMARY OF THE INVENTION

According to a first broad aspect of the present invention, there is provided a reservation and management system for recreational activities offered by a plurality of activity operators. The system comprises a database for storing: information regarding a plurality of recreational activities, for each activity of the recreational activities the information including: a description of the activity; an activity class; identification information for the activity operator offering the activity; inventory information for the activity; a financial record containing financial information, for reservation transactions carried out for the activity, including payment details, reseller commission details and identification information of a reseller, and profile information regarding a plurality of subscribers, including the activity operators and resellers, the profile information including a definition of information access rights for each subscriber. The system also comprises a reservation information compiler for receiving an information request for an activity, according to an activity class, and in communication with the database for retrieving descriptions of the activities of the activity class and for providing the requested information; a transaction module for receiving a reservation transaction request for an activity, and in communication with the database for updating the inventory information and the financial record for the activity following the reservation transaction request and sending a transaction confirmation; a plurality of client purchase modules receiving, through a client interface, requests for activity information and reservation transactions, and in communication with the reservation information compiler for providing the information request for an activity, and for receiving the requested information for activities of the activity class, and in communication with the transaction module for providing the reservation transaction request for an activity and for receiving the transaction confirmation, and for displaying the requested information and the transaction confirmation through the client interface; a plurality of reseller purchase modules receiving, through a reseller interface, requests regarding activity information and reservation transactions, and in communication with the reservation information compiler for providing the information request for an activity, and for receiving the requested information for activities of the activity class, in communication with the transaction module for providing the reservation transaction request for an activity for a client and for receiving the transaction confirmation, and receiving, in accordance with the profile information, a the commission details from the financial records, and displaying the commission details, the requested information and the transaction confirmation through the reseller interface; and an operator inventory management module receiving, through an operator interface, setup information for new activities, activity information updates, and in communication with the database for setting up the new activities and for providing the updates and for receiving activity information for all activities offered by the operator, in accordance with the profile information, and displaying the activity information through the operator interface.

According to a second broad aspect of the present invention, there is provided a method for setting up a new activity record for an operator offering a recreational activity in a centralized reservation and inventory management system, the method comprising: defining an activity model having fields related to at least activity equipment, staff requirements and activity regulations; from the activity model, creating a template for each activity class by customizing the fields to include class-specific attributes and rules; the operator providing an activity definition for the new activity according to the class-specific attributes of the activity template; storing the activity definition as an activity record in the centralized reservation and inventory management system.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

A preferred embodiment of the present invention will now be described in detail.

Figure 1:
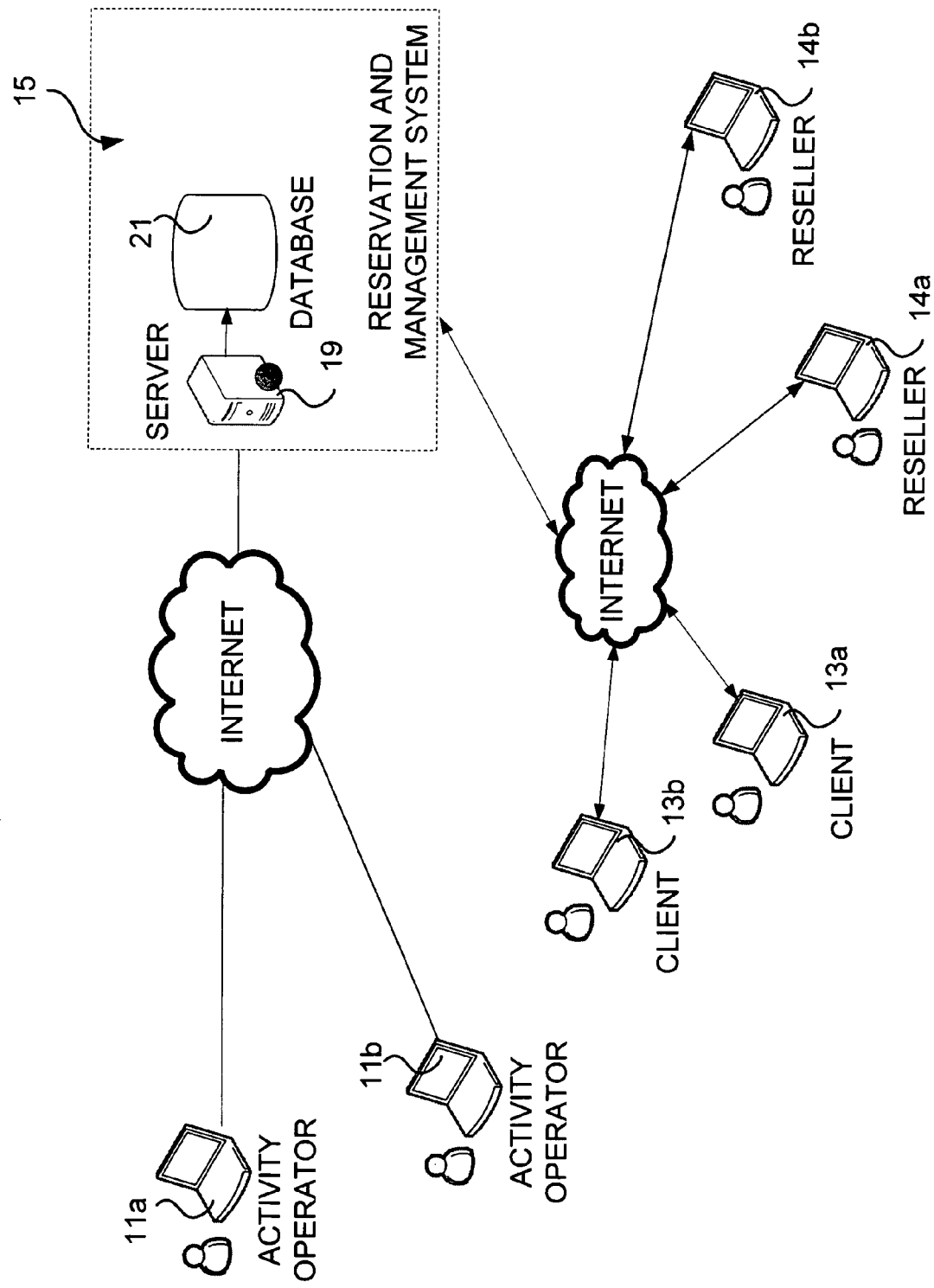
FIG. 1 is a block diagram of a network allowing clients, resellers and operators to interact according to the present invention.

Referring to FIG. 1, the preferred embodiment of the system contains activity operators at stations 11a, 11b communicating with a reservation and management system 15 through a public network, such as the Internet. Clients at client stations 13a, 13b, as well as resellers at reseller stations 14a, 14b communicate with the same reservation and management system 15 through a public network. In the preferred embodiment of the present invention, this network is the Internet. The stations 11, 13 and 14 communicate via any suitable transmission media, such as an ordinary public telephone line, a data quality line, a radio link or any other transmission media suitable for data transfer between the components of the system. The system of the present invention allows operators to manage and control inventory of services/goods offered, while enabling clients to verify the real-time availability of services/goods and to reserve and/or purchase them. A client accessing the system has the ability to search, retrieve and compare a plurality of services/goods offered by a plurality of operators and to make a reservation and/or purchase transaction for a desired service/good.

In the preferred embodiment of the present invention the stations 11, 13 and 14 are computer platforms running, for example, client software or a web-based application and comprise: a computer, an input system including a keyboard and a mouse, a display device, a communication control device for communication with the network and possibly an external storage device. The computer includes a central processor unit (CPU), a read only memory (ROM), a random access memory (RAM) and an internal storage device. The software running at the stations 11, 13 and 14 may reside on an external storage device or an internal one. The storage device may be any one or a combination of, hard disks, optical storage devices, magnetic tape, flash memory, etc.

An activity operator 11 is the entity providing the recreational activity, such as a ski school, a dogsled company, a horseback ranch, a spa, etc., for which reservations can be made the reservation and management system 15.

A client 13 is any user who uses the reservation system 15 in order to make reservations for recreational activities, either as part of planning a trip or during their stay at a resort. In the case in which the client 13 makes a reservation before a trip, the client station may be any terminal with web-browsing abilities, such as a personal computer, a web-enhanced cellular phone or a personal digital assistant. In the case in which the client is already at the resort, reservations can be additionally be made by using touch-screen terminals that provide an interface and access to the functionalities of the reservation system 15.

A reseller 14 may either be reservation center, a hotel concierge, a travel agent, a tour operator, etc. Resellers can use the reservation system 15 to make reservations for activities on behalf of clients 13 and receive a commission from activity operators 11.

The reservation and management system 15 preferably includes a server 19 and a data storage device 21. The data storage device 21 contains information stored in relational databases controlled and managed using software well-known to those skilled in the art. The information stored relates to recreational activities offered by activity operators 11 subscribing to the services of the reservation and management system 15, as well as profile information for a plurality of subscribers. The server 19 receives all requests for information regarding the recreational activities offered by the subscribing activity operators 11 from client and reseller stations 13, 14 and ensures security of the transactions by implementing various security protocols. The server 19 uses the information stored on the database 21, which includes account details for all of its subscribers, as well as information for all recreational activities offered by activity operators.

In the preferred embodiment of the present invention, the server 19 is a secure server protected by firewall and encryption technologies in order to ensure security of the information stored in the database 21. The server 19 is preferably a web server and uses a web-interface to provide access to subscriber accounts for registration and modifications.

Subscribers are preferably activity operators and resellers, but may also include clients.

Now, with respect to FIG. 2, a reservation and management system 15 in accordance with the preferred embodiment of the present invention will be described. Access to the system 15 is provided through user interfaces, customized for each user type, such as client interface 31, reseller interface 35 and operator interface 43. Preferably the user interfaces 31, 35, 43 are web interfaces and the reservation and management system 15 includes a web server for responding to requests received from the user interfaces 31, 35, 43.

User interfaces 31, 35, 43 preferably include display means, such as a display monitor or other type of screen depending on the type of station used, and input means, such as a keyboard, a mouse, a touchpad or a touch screen, depending on the type of station used. The user interfaces 31, 35, 43 receive user input representing an information or transaction request, as well as other requests, depending on the user type, and provide the input to the appropriate modules to which they are connected in order for the requests to be processed. The user interfaces 31, 35, 43 then receive the information requested and display it using the display means to the user.

A client interface 31 receives requests for activity information and reservation transactions from clients. The client interface 31 is in communication with a client purchase module (CPM) 33, receiving the requested activity information and reservation transaction confirmation from the CPM 33 and displaying it.

A reseller interface 35 is in connection with a reseller purchase module (RPM) 37 and receives requests for activity information and reservation transactions from resellers. The reseller interface 35 then receives the requested activity information and reservation transaction confirmations from the RPM 37 such that these may be displayed for the reseller.

An operator interface 43 allows an operator to retrieve and to consult activity information from the reservation and management system 15. An operator can also, through the operator interface 43, provide input information relating to activity inventory transactions, updates, new activity setups, etc. The operator interface 43 is in communication with an operator inventory management module 41 to which it provides setup information for new activities, as well as any updates and/or requests for activity information for all activities offered by the particular operator.

At the core of the reservation and management system 15 is the activity and subscriber database 25, storing information 45 regarding a plurality of recreational activities and profile information 69 for all subscribers. The data fields of each activity record will vary depending on the activity class. Preferably, for each activity, at least the following fields are specified: an activity description 47, an activity class 49, identification information of the activity operator 55, inventory information 51 and a financial record 53. The information contained by each field is described in more detail hereinbelow.

The activity description 47 is preferably a short narrative description of the activity offered, including activity policies, rates, special offers, and optionally including pictures, video, or any other type of media of an informative or promotional nature. The activity class 49 attribute allows grouping similar activities in a same category, such that these may be easily searchable by a user looking for a particular type of recreational activity. Examples of activity classes include snowmobile activities, dogsled activities, tubing activities, etc. For each activity, activity operator identification information 55 is provided, allowing to produce reports of all activities offered by a given operator.

The database 25 also includes inventory information 51 for the activity. For each activity, the number of places available for reservation are calculated by the reservation and management system 15 depending on the class-specific attributes that limit inventory for that activity.

For example, in the case of a snowmobile operator, the inventory is limited by the total number of snowmobiles and by the number of passengers that can be riding at a time in a snowmobile, as well as the different start times at which the activity is offered. The inventory count (availability) starts at full capacity and, as reservations are received, availability diminishes until full capacity is reached.

In another example, a gondola operator might have unlimited capacity and the inventory for this activity would be limited only by opening hours.

In yet another example, a ski school operator has many class-specific attributes according to which inventory availability is calculated. The number of instructors required to work each day, their individual qualification limitations, as well as the maximum group sizes associated with each lesson/instructor are all attributes and rules that define the way in which the inventory is managed by the reservation and management system 15.

The database 25 further provides a financial record 53 for each activity, containing financial information and other details of reservation transactions carried out for the activity. The financial information includes details as to whether the payment was processed (if credit card payment was used), if payment is still outstanding (if the payment is due before the activity), or, in the case in which the transaction is initiated by a reseller on behalf of a client, commission details and identification information for the reseller.

The financial record 53 also includes a customer ID 63 which contains identification information for the client. In the embodiment in which the client is a subscriber of the reservation and management system 15, the customer ID 63 is a key allowing to retrieve the client profile information from the subscriber profile information 69. If the client is not a member of the reservation and management system 15, the customer ID 63 contains information, such as the client name or a username, allowing to uniquely identify the particular client.

Other information stored in the financial record 53 depends on the type of payment system implemented by the reservation and management system 15. In one embodiment of the present invention, the reservation and management system 15 accepts credit card payment from users at the time the reservation transaction for an activity takes place. Credit card information may be provided as a credit card number, if the client is requesting the transaction over the Internet, or the credit card can be swiped directly if the client has access to a terminal/kiosk. The payment system may include a merchant account, a third party credit card processor, Paypal payment and/or an electronic check system, such as PayByCheck.

If the reservation and management system 15 does not accept electronic payment, the financial record 53 contains a billing address 65 at which the client or the reseller requesting the reservation transaction receives an invoice. If the reservation is made at a terminal/kiosk, the client can provide his hotel name and room number as a means of payment.

In the case in which a reseller requested an activity reservation on behalf of a client, the reseller's commission information 67 is also stored in the financial record 53. If however, the reservation and management system 15 is such that the client must pay for the activity directly to the activity operator, the financial record 53 indicates that payment is outstanding for the particular activity reservation.

Finally, the financial record 53 includes the reservation details 81, such as the number of places reserved, the start time of the activity (if applicable), the staff member responsible (if applicable), etc.

The database 25 also includes profile information 69 for registered users (subscribers) of the reservation and management system 15. In the preferred embodiment of the present invention, the subscriber profile information 69 contains at least the following fields: subscriber type 71, subscriber ID 79, subscriber contact information 75, subscriber permissions 73 and transaction history 77. Part of the information of the subscriber profile 69 is input by the users when first accessing the reservation and management system 15 and registering as one of a client, reseller or operator.

The subscriber ID 79 is a unique identifier for each subscriber of the reservation and management system 15. The subscriber type 71 indicates whether the subscriber is an operator, a reseller or a client. The subscriber permissions 73 field specifies what information and what views a given subscriber type 71 has access to. The subscriber permissions 73 field preferably defines two types of rights: general access rights providing limited access to the database 25 contents, and special rights, which provide customized access depending on the subscriber type 71. As an example of special rights, a subscriber identified as an operator is granted access to setup/modify, retrieve and receive reports of any activity information (description 47, inventory 51, financial record 53) for the activities for which the given operator is the activity provider. As another example, a reseller has the right to retrieve and update reservation information for particular clients, view transaction history (if the clients are subscribers), and create new client accounts. A client's permissions however would be more limited, allowing a client to browse through the different activities managed by the system, search for availability, request a reservation transaction (a booking or a cancellation) and view a history of past transactions.

The subscriber contact information 75 includes a name, a physical address, a telephone/fax number, an email address, payment information, etc. If the subscriber is an operator, the name will preferably contain the name of the activity operator, as well as the name of a contact person.

The event history 77 contains historical data for a particular subscriber. For example, for an operator, the event history 77 contains information regarding all information requests, setups and updates performed by the operator. For a client, the event history 77 contains information related to all past information requests and reservation transactions performed by the client, while for a reseller, the event history 77 contains historical data regarding all transaction requested by the reseller.

Still with respect to FIG. 2, a reservation information compiler (RIC) 27 and the reservation transaction module (RTM) 29 will be described. In the preferred embodiment of the present invention the functionality of the RIC 27 and the RTM 29 are grouped within a server 19. In alternative embodiments however, the two modules might be physically distinct units.

The RIC 27 receives requests for activity information from the purchase modules, i.e. the CPM 33 and the RPM 37. The activity information requests may be general, i.e. a listing of all activities managed by the reservation system 15, or specific to activities from a particular activity class, in which case the activity information request includes an activity class parameter. Other types of activity information requests include operator requests, i.e. a list of all activities offered by a particular operator, an activity name request, a participant type request (i.e. all activities offered for children), a location request (i.e. all activities offered in a particular geographical area), an operating hours request (i.e. all activities starting within the next 15 minutes or all activities that last under 2 hours), etc.

The RIC 27 analyzes the activity information requests received and translates them into database queries which are then provided to the activity database 25. The activity description 47 is retrieved form the database 25 in response to the request. The RIC 27 also verifies that the originator of the request is authorized to receive the information requested. If according to the subscriber permissions, the originator has the required authorization level, the information retrieved from the activity database 25 in a raw format, is sent to the purchase module 33, 37 to be formatted for display.

The RTM 29 receives reservation transaction requests from the CPM 33 and the RPM 37. The reservation transaction requests contain such information as an activity selection, the number of places reserved, the payment details, the start time (optionally) and any other information required for the purpose of reserving the particular activity. The RTM 29 analyzes the request and verifies the inventory information 51 of the activity record in the database 25 in order to determine whether the transaction is possible. If it is, the RTM 29 updates the inventory information 51 and the financial record 53 of the particular activity for which the reservation is requested and sends a transaction confirmation to the purchase module which originated the request.

In the case in which the reservation transaction did not include payment details, such as would be the case for a reservation transaction received from an RPM 37, the RTM 29 will send invoices for the outstanding amounts.

In the embodiment in which payment is provided by credit card, the RTM 29 receives an acknowledgement from a payment server 39 that the payment has been authorized. The acknowledgement may be sent by the payment server 39 to the CPM 33 and then, from the CPM 33 to the RTM 29, or directly from the payment server 39 to the RTM 29.

The reservation and management system 15 also includes an operator inventory management module 41 which will now be described. The operator inventory management module 41 is in communication with the operator interface 43 from which it receives setup information for new activities, activity information updates, as well as requests for activity information retrieval from the database 25 for activities offered by the operator.

In one embodiment of the present invention the operator inventory management module 41 is part of a server 19, located remotely, receiving requests from the operator interface 43. In that embodiment the operator inventory management module 41 is in communication with a login module (not shown). The login module receives login information from an operator through the operator interface 43 and verifies in the subscriber profile information 69 of the database 25 whether the operator is a subscriber. If the operator is correctly identified as being a subscriber registered with the reservation and management system 15, the requests received from the operator interface will be processed by the operator inventory management module 41.

Alternatively, the operator inventory and management module 41 may be part of the same unit as the operator interface 43, forming a dedicated operator terminal which is in communication with the activity database 25. In that case, there would be no need for a login module to validate the identity of the operator, as all requests coming from the dedicated terminal would be understood to come from an authorized operator.

The operator inventory management module 41 is also responsible for receiving activity information as requested by an operator through the operator interface 43 and provide the requested information in a format suitable for display, such as a web page, in the case in which the operator is accessing the system through a web browser.

In one embodiment of the present invention, the operator inventory management module 41 is in communication with a report module which receives the information retrieved by the operator inventory management module 41 from the database 25 and formats it to provide a report to the operator through the operator interface 43. Such a report could be, for example, a reservation list for an activity and details of clients having reserved the activity, a list of all clients that have reserved an activity over a year, a list of resellers promoting and making reservations for an activity, a comparison report between different activities offered by the same operator, a list of outstanding financial records, etc.

Figure 2:
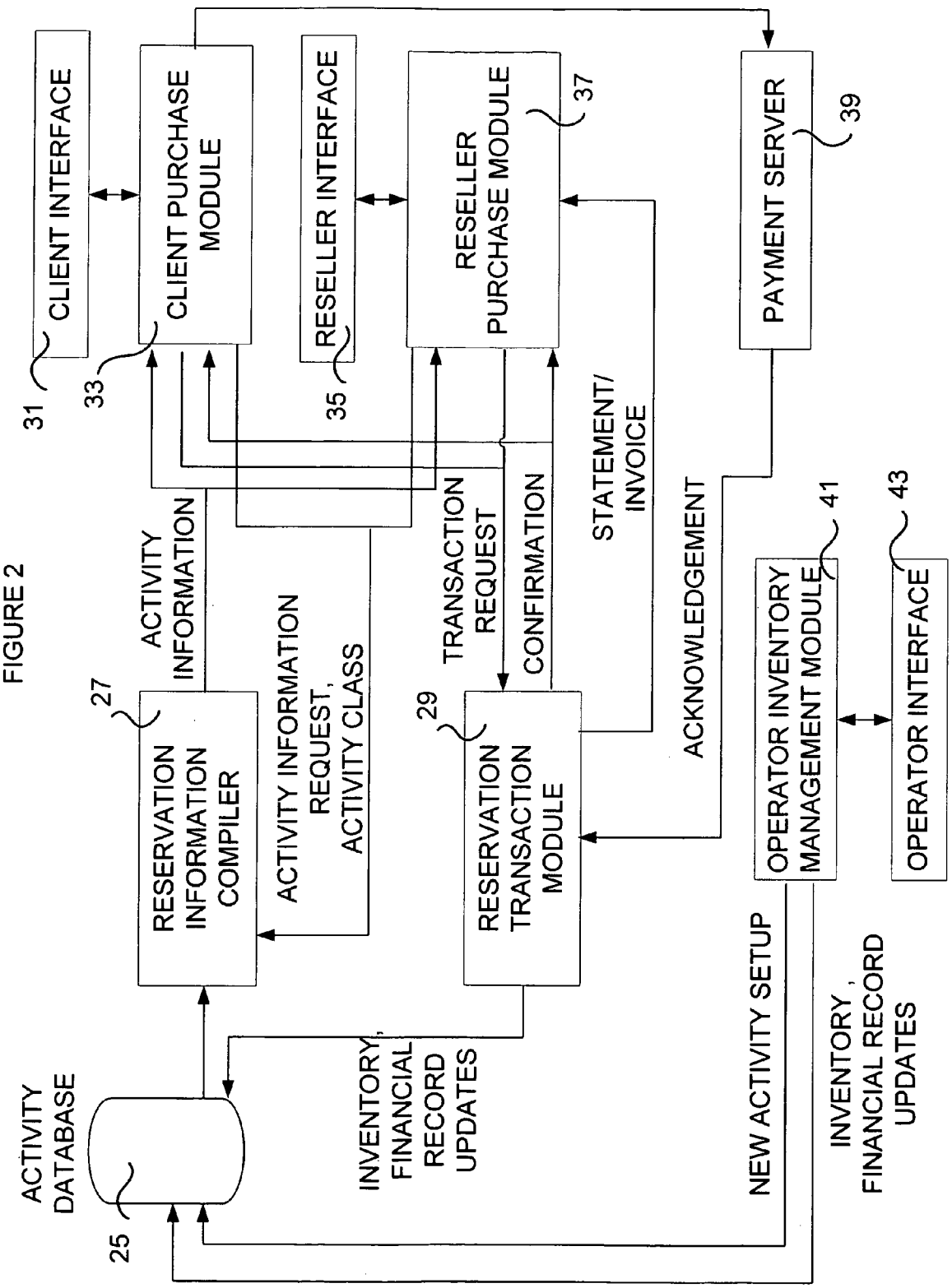
FIG. 2 is a block diagram of a reservation and management system for recreational activities according to the present invention.
Figure 3:
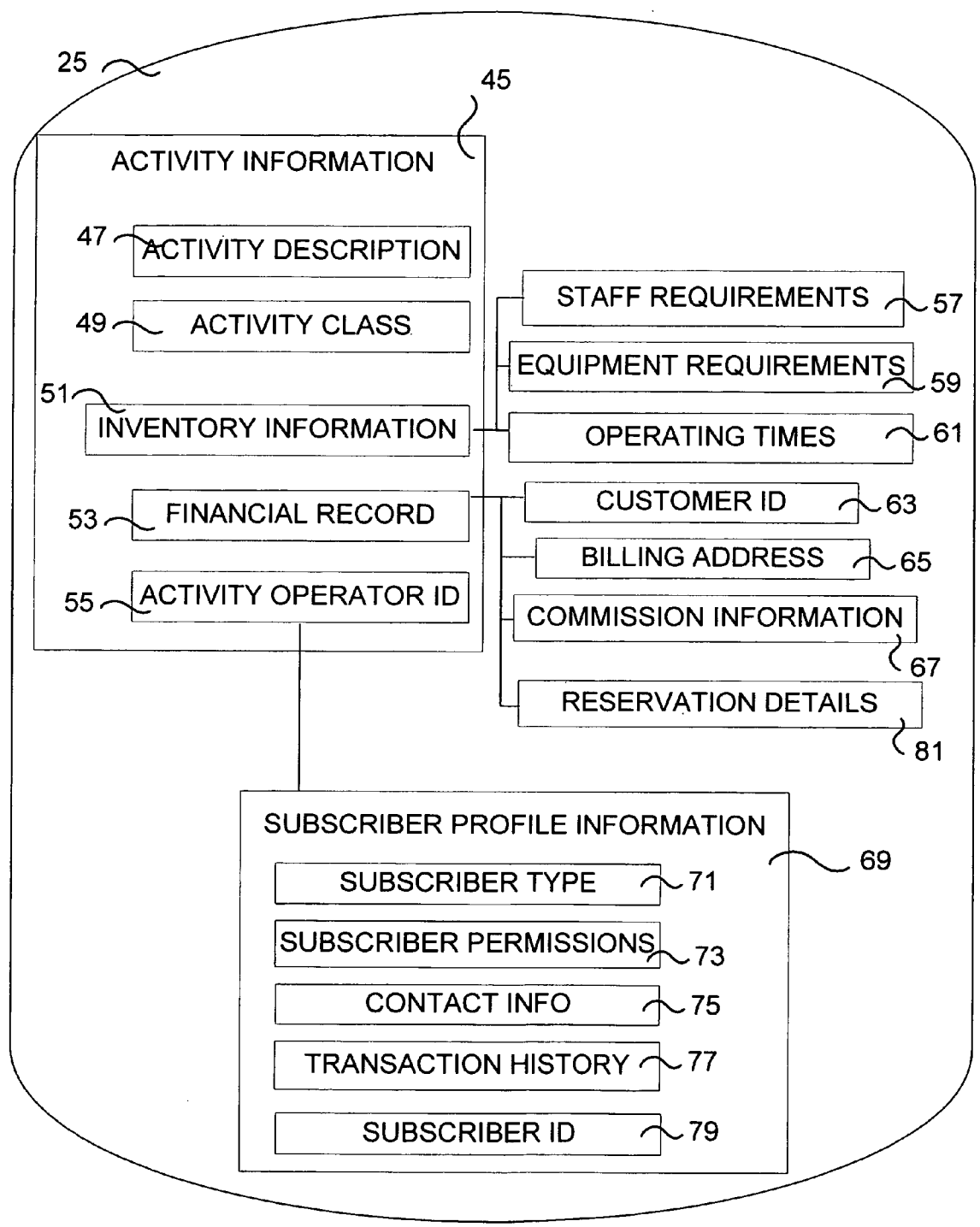
FIG. 3 is a block diagram of a database of the reservation and management system for recreational activities according to the present invention.

The system of FIG. 2 comprises a plurality of client purchase modules (CPMs) 33. Each CPM 33 receives from the client interface 31 requests for activity information and reservation transactions. The CPM 33 is in communication with the RIC 27 for providing the activity information request. The RIC 27, as explained above, retrieves the information and provides it to the CPM 33 so that it may be displayed to the user through the client interface 31.

The CPM 33 is also in communication with the RTM 29 to which it provides the reservation transaction request for an activity and from which it receives a transaction confirmation. The CPM 33 then displays the transaction confirmation through the client interface.

The system 15 of FIG. 2 also comprises a plurality of reseller purchase modules (RPMs) 37. An RPM 37 of the reservation and management system 15 is similar to the CPM 33 in that it also receives, from a reseller interface 35, requests regarding activity information and reservation transactions. The RPM 37 is in communication with the RIC 27 for providing the activity information request and for receiving the requested information. The RPM 37 is also in communication with the RTM 29 for providing a reservation transaction request for an activity that the reseller is reserving on behalf of a client. The RPM 37 receives from the RTM 29 transaction confirmation following a reservation transaction request. The RPM 37 also receives, in accordance with the reseller permissions 73, as defined in the reseller profile information 69 financial information, such as commission information for all activities booked by the reseller, from the financial records 53 of the database 25.

The RPM 37 provides all information received from the RIC 27 and the RTM 29 to the reseller interface 35 to be displayed to the reseller.

Now, with respect to FIG. 4, a method for setting up a new activity record for an operator offering a recreational activity in a centralized reservation and inventory management system 15 will be described. Before setting up an activity record for a recreational activity in the centralized reservation and inventory management system 15, the operator needs to be registered as a subscriber of the system 15. At registration time, the operator provides subscriber profile information 69, such as subscriber ID 79, contact information 75, subscriber type 71, i.e. operator, payment account information, etc.

Figure 4:
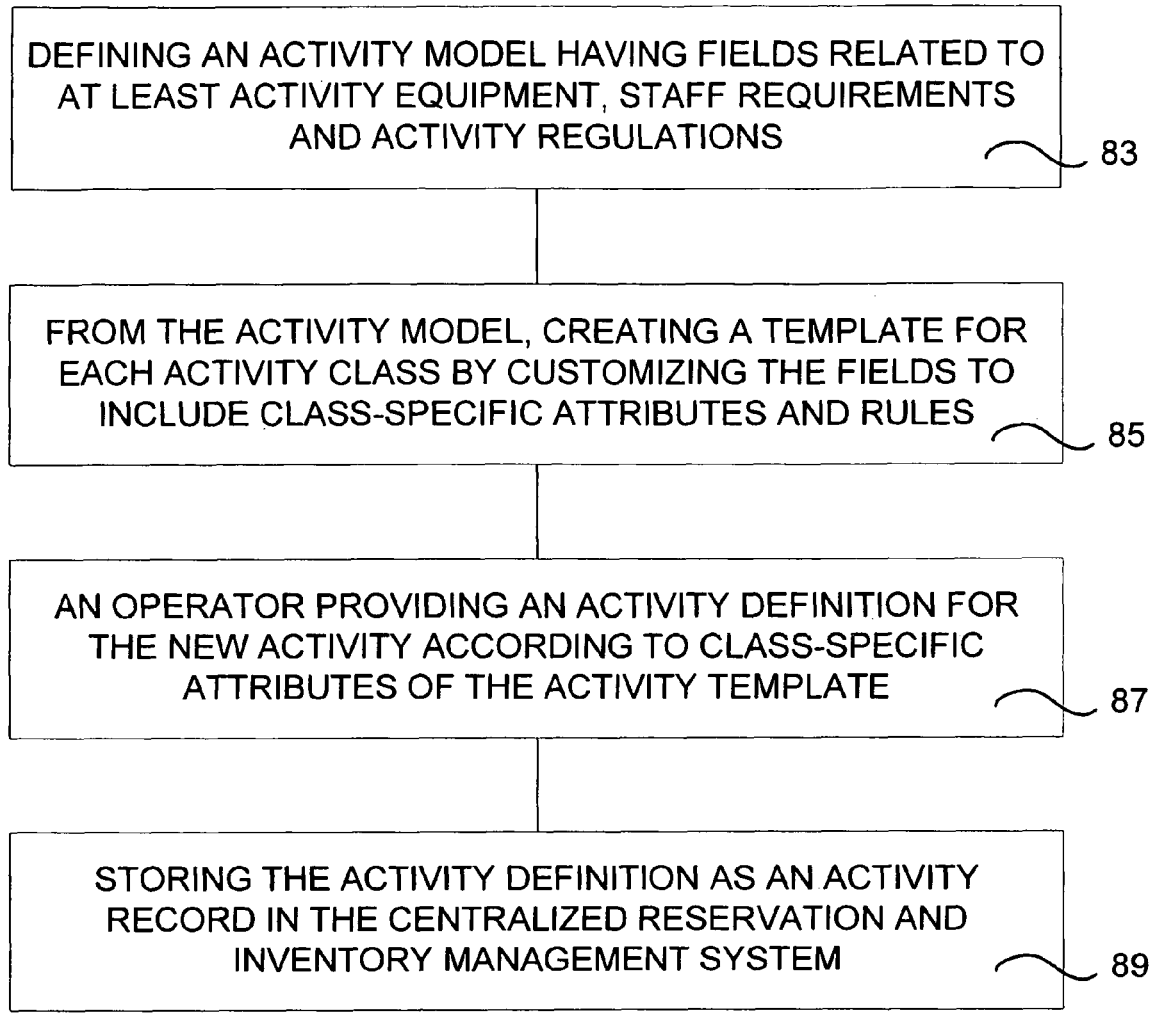
FIG. 4 is a block diagram of a method for setting up a new activity record in a reservation and management system according to the present invention.

Then, as per FIG. 4, in a first step 83, an activity model is defined having fields related to at least activity equipment, staff requirements and activity regulations. The activity model is general to all activities that can be managed by the system 15. The fields of the activity model can be customized for different types of activities and especially, for each activity class.

In step 85, a template is created for each activity type by customizing the fields of the general model to include class-specific attributes and rules. An example of activity class is the class of dogsled operators. The activity template for dogsledding includes attributes and rules such as: the activity type, i.e. family activity, adventure activity, the name of the activity, the location of the activity, a description of the activity, the price range for the activity, the starting times and the duration of the activity, the capacity of a dogsled, the number of guides and their availabilities, etc.

Then, in step 87, an operator provides an activity definition for an activity according to the class-specific attributes of the activity template. Finally, in step 89, the activity definition is stored as an activity record in the centralized reservation and inventory management system 15.

Once the activity class template for dogsledding has been created, all operators providing the dogsledding activity can use the template in order to define their own activities and create activity records within the system 15.

The interaction between a client and the reservation and management system 15 of the present invention will now be described. A client may access the system 15 from a client station 13*b* having a client interface 31 using any commercially available Internet web browser, such as Microsoft Internet Explorer™ or Netscape Navigator™. The client can access the website of the reservation and management system 15 directly by requesting the Uniform Resource Locator (URL) address corresponding to the reservation and management system website. Upon requesting the URL address, the web server of the reservation and management system 15 responds by providing the home page entry point to the system. Alternatively, in the case in which the client accesses the reservation and management system 15 from a terminal at which no keyboard or similar input means are provided, the home page entry point would be pre-loaded, such that the client could directly start browsing through the list of activities using a touch screen.

Once the client has access to the system website, he may either browse through the selection of activities or conduct a search for a desired activity using the integrated website search engine. One possibility is using a search function that requires that the client provides keywords or phrases that are descriptive of the desired activity. Another possibility for the client is to search through the activities by using search criteria. Some examples of search criteria are: activity operator, activity (ski school, dogsled, etc.), activity class, activity date/time range, experience type (relax, adrenaline, etc.), location (transportation included, no transportation, walking distance), participant type (adult, children, families, etc.) Yet another possibility is that of selecting the activity or a group of activities from a pull down menu.

Once the client has narrowed down the number of activities to a selected few and made a choice regarding a selected activity, he requests a reservation transaction for the particular activity. In the embodiment in which the client is not a subscriber of the reservation and management system 15, the client needs to provide all personal, identification and payment information required by the particular activity. If the client needs to become a subscriber in order to use the functionalities of the reservation and management system 15, a registration page will be displayed through the client interface 31. The registration page will request that the client provide information such as subscriber ID, subscriber type, contact information, payment information (optional), etc. and all other information required according to subscriber profile information 69. Upon providing the required information, a client account is created and stored on the database 25. Once the client has a subscriber ID and associated password, he can use the subscriber ID and password for all future reservation sessions.

The interaction between an operator and the reservation and management system 15 will now be described. An operator accessing the system 15 from an operator station has access to the complete system functionality. The operator may access the system through an operator interface at an operator station, through an Internet browser, such as Microsoft Internet Explorer™ or Netscape Navigator™. Upon accessing the home page entry point of the system, the operator, who is a subscriber of the system 15 and has already registered, accesses a private area of the website by providing a subscriber ID and associated password. The operator can view inventory availability at all times and can update the inventory if reservations were made through other channels and are not yet shown by the system.

Alternatively, the activity operator can install a web application or other type of software application at the operator station allowing him to setup and edit activity information for activities managed by the reservation and management system 15. In such an application, the operator interface 43 and the operator inventory management module 41 would be integrated locally on the operator station. The operator inventory management module would have the ability to connect to the activity database and provide the setup and update information, as well as retrieve the activity information for the activities offered by the operator.

Some of the functionality available to an operator by accessing the reservation and management system 15 will be described below. The activity operator can setup or edit activity information related to: geographical location, activity class, activity description and activity rules, inventory information, financial record, etc. as well as edit the operator subscriber profile information, such as the subscriber contact information. Additionally, the activity operator can request real-time reports regarding the status of the activities managed by the reservation and management system. Such reports may be related to: arrivals list, reservation list, revenue type, reservation source, comparisons between different activities, customer list, reseller list, etc.

A reseller interacting with the system 15 can check the availability of a particular activity, just as a client would, by searching by activity operator, activity type, activity name, participant type, location, operating period, etc. The reseller can also locate a client by searching for a particular activity/client name, subscriber ID, a client telephone number, a client e-mail address, etc. If the client is not found to be a registered subscriber of the centralized reservation and inventory management system 15, the reseller can create a new subscriber. The reseller can also access the subscriber profile information of a client, view a list of existing reservations, a transaction history and can change or cancel existing reservations.

In order to make a new reservation, a reseller searches through the listed activities, chooses an activity on behalf of a client and checks the availability of the activity. The reseller then finds out whether the client is a registered subscriber of the centralized reservation and management system 15 and if not, creates a new subscriber account for the client. The reseller then submits a reservation transaction request for the activity. Upon receiving a transaction confirmation, the reseller e-mails/prints a copy for the client.

In order to change/cancel a reservation, the reseller must access the attendee list associated with an activity record and make the change/cancellation. The reseller will at the same time send am e-mail to all participants to announce the change/cancellation and information regarding refunds (if applicable).

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A reservation and management system for recreational activities offered by a plurality of activity operators, comprising:
   a processor in a computer system;
   a memory accessible by the processor and comprising:
      a) information regarding a plurality of recreational activities, at least some of said recreational activities having a plurality of class-specific attributes corresponding to at least activity equipment, staff requirements, and activity regulations, said information including:
         i) a description of said activity;
         ii) an activity class;
         iii) identification information for said activity operator offering said activity;
         iv) inventory information for said activity;
         v) a financial record containing financial information, for reservation transactions carried out for said activity, including payment details, reseller commission details and identification information of a reseller, and
      b) profile information regarding a plurality of subscribers, including said activity operators and resellers, said profile information including a definition of information access rights for each subscriber;
   a plurality of software modules coupled to the processor, the software modules configured as follows:
   a reservation information compiler for receiving an information request for an activity, according to an activity class, and in communication with said database for retrieving descriptions of said activities of said activity class and for providing said requested information;
   a transaction module for receiving a reservation transaction request for an activity, and in communication with said database for updating said inventory information and said financial record for said activity following said reservation transaction request and sending a transaction confirmation;
   a plurality of client purchase modules receiving, through a client interface, requests for activity information and reservation transactions, and in communication with said reservation information compiler for providing said information request for an activity, and for receiving said requested information for activities of said activity class, and in communication with said transaction module for providing said reservation transaction request for an activity and for receiving said transaction confirmation, and for displaying said requested information and said transaction confirmation through said client interface;
   a plurality of reseller purchase modules receiving, through a reseller interface, requests regarding activity information and reservation transactions, and in communication with said reservation information compiler for providing said information request for an activity, and for receiving said requested information for activities of said activity class, in communication with said transaction module for providing said reservation transaction request for an activity for a client and for receiving said transaction confirmation, and receiving, in accordance with said profile information, a said commission details from said financial records, and displaying said commission details, said requested information and said transaction confirmation through said reseller interface; and
   an operator inventory management module receiving, through an operator interface, setup information for new activities, activity information updates, and in communication with said database for setting up said new activities and for providing said updates and for receiving activity information for all activities offered by said operator, in accordance with said profile information, and displaying said activity information through said operator interface, said operator inventory management module adapted to dynamically manage availability of said recreational activities depending on a set of rules and said class-specific attributes that limit inventory, said availability starting at full capacity and diminishing as reservations are received, whereby a reservation for a given recreational activity may have an impact on availability of another recreational activity.

2. A system as claimed in claim 1, wherein said reservation information compiler and said transaction module are part of a server receiving requests from a plurality of subscribers.

3. A system as claimed in claim 2, wherein said purchase modules are part of said server.

4. A system as claimed in claim 2, wherein said operator inventory management module is part of said server.

5. A system as claimed in claim 1, wherein said subscribers include clients and wherein said database further stores client profile information and client transaction history data and wherein said client purchase modules comprises means for displaying said history data.

6. A system as claimed in claim 1, further comprising a payment server receiving payment details from said client purchase module as part of a transaction request and for providing a payment acknowledgement to said transaction module.

7. A system as claimed in claim 1, wherein an activity class is a class of snowmobile activities.

8. A system as claimed in claim 1, wherein at least some of said purchase modules further comprise a ticket generator module for providing a ticket for said activity following a reservation request.

9. A system as claimed in claim 1, further comprising a report module in communication with operator inventory management module for providing a reservation list for an activity and details of clients having reserved said activity.

10. A system as claimed in claim 1, wherein said transaction module further comprises a billing module in communication with said reseller purchase module for sending billing statements for reservations received from said reseller purchase module.

11. A system as claimed in claim 1, wherein said profile information includes login information for each subscriber and further comprising a login module in communication with said reseller purchase module and said operator inventory management module for receiving login information and identifying said subscriber.

* * * * *